US006321191B1

(12) United States Patent
Kurahashi (10) Patent No.: US 6,321,191 B1
(45) Date of Patent: Nov. 20, 2001

(54) RELATED SENTENCE RETRIEVAL SYSTEM HAVING A PLURALITY OF CROSS-LINGUAL RETRIEVING UNITS THAT PAIRS SIMILAR SENTENCES BASED ON EXTRACTED INDEPENDENT WORDS

(75) Inventor: Masayuki Kurahashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/456,980

(22) Filed: Dec. 7, 1999

(30) Foreign Application Priority Data

Jan. 19, 1999 (JP) .................................................. 11-010228

(51) Int. Cl.[7] ............................ G06F 17/27; G06F 17/21; G06F 17/30
(52) U.S. Cl. .......................... 704/8; 704/7; 707/4; 707/5; 707/536
(58) Field of Search .................................. 704/2, 8, 3, 4, 704/5, 6, 7, 9, 1; 707/1, 2, 3, 4, 5, 6, 531, 532, 533, 536; 434/156, 157, 167, 169

(56) References Cited

U.S. PATENT DOCUMENTS

| | | | |
|---|---|---|---|
| 5,724,593 | * 3/1998 | Hargrave, III et al. | 704/7 |
| 5,867,811 | * 2/1999 | O'Donoghue | 704/1 |
| 5,890,103 | * 3/1999 | Carus | 704/9 |
| 5,963,940 | * 10/1999 | Liddy et al. | 707/5 |
| 6,006,221 | * 12/1999 | Liddy et al. | 707/5 |
| 6,064,951 | * 5/2000 | Park et al. | 704/8 |
| 6,077,085 | * 6/2000 | Parry et al. | 434/322 |
| 6,151,624 | * 11/2000 | Teare et al. | 709/217 |
| 6,182,062 | * 1/2001 | Fujisawa et al. | 707/3 |

FOREIGN PATENT DOCUMENTS

| | | | |
|---|---|---|---|
| 1014278A1 | * 6/2000 | (EP) | . |
| 2337611A | * 11/1999 | (GB) | . |
| 2338089A | * 12/1999 | (GB) | . |
| A-9-50435 | 2/1997 | (JP) | . |
| 411345249 | * 12/1999 | (JP) | . |
| 97/18516 | * 5/1997 | (WO) | . |

OTHER PUBLICATIONS

Dialog File 88, Acc. No. 03707845: "Gauging Similarity With N–grams: Language–Independent Categorization of Text", Marc Damashek, Science, vol. 267, No. 5199, p 843 (6), published Feb. 1995.*

* cited by examiner

Primary Examiner—Joseph Thomas
(74) Attorney, Agent, or Firm—Oliff & Berridge, PLC (57) ABSTRACT

The present invention implements retrieval of mutually related sentences even between sentences in a wide variety of languages. A related sentence retrieval system is provided with n (n is 3 or a greater natural number) cross-lingual retrieval systems for bidirectionally retrieving related sentences between sentences written in language P and sentences written in other languages A to F, a language P sentence input unit is shared by the cross-lingual retrieval systems, and the language P sentence output unit is also shared by them to implement bidirectional retrieval of related sentences via language P between sentences in the other n languages. Thus sentences in language P are handed over back and forth between the cross-lingual retrieval systems to implement bidirectional related sentence retrieval between sentences in n different languages.

4 Claims, 9 Drawing Sheets

| IDENTIFIER | JAPANESE | ENGLISH |
|---|---|---|
| 1 | 計算はそろばんで玉を動かして行なわれる。 | Computations are performed on the abacus by manipulating the counters on it. |
| 2 | 私はどうでもいいという気持ちに取りつかれた。 | I possessed by a spirit of abandon. |
| 3 | 捜索は完全に打ち切られた。 | The search was completely abandoned. |
| 4 | 平然と子供を見捨てた。 | He coolly abandoned his child. |
| ..... | ..... | ..... |

FIG.5

| IDENTIFIER | JAPANESE | ENGLISH |
|---|---|---|
| 1 | 計算、そろばん、玉、動かす、行なう | Computations, perform, abacus, manipulate, counter |
| 2 | 私、どう、いい、気持ち、取りつかれる | I, possess, spirit, abandon. |
| 3 | 捜索、完全、打ち切られる | search, completely, abandon |
| 4 | 平然、子供、見捨てる | He coolly abandon, child |
| ····· | ····· | ····· |

RELATED SENTENCE RETRIEVAL SYSTEM HAVING A PLURALITY OF CROSS-LINGUAL RETRIEVING UNITS THAT PAIRS SIMILAR SENTENCES BASED ON EXTRACTED INDEPENDENT WORDS

BACKGROUND OF THE INVENTION

1. Field of the Invention

The present invention relates to a system for retrieving related sentences between sentences written in one language and sentences written in another language, and more particularly a system using sentences written in still another language as intermediate language sentences.

2. Description of the Related Art

With the improvement of the performance of computers, development of electronic dictionaries and progress of technology in natural language processing among other things, many machine translation techniques have been proposed so far.

However, it is still difficult to affirm that a machine translation system with a translation capability of sufficient accuracy has been implemented.

According to the related art, there has been proposed a technique by which a large number of pair data pieces in an original language (first language) sentence and a translated language (second language) are prepared; similar sentences to a first language input sentence are retrieved from the first language sentences in the pair data; second language sentences corresponding to the first language sentences as the result of this retrieval are then outputted from the pair data; and these outputted second language sentences are referred to the user, thereby to improve the quality of translation from the input sentence in the first language sentence.

As methods for obtaining sentences similar to the first language input sentence from the set of first language sentences in the pair data, there have been proposed a method to determine a sentence of high similarity based on the number of words commonly included in the input sentence and sentences to be retrieved; and, as disclosed by Japanese Published Unexamined Patent Application No. 9-50435 (1997), a method to determine a first language sentence having a vector close to the vector corresponding to the first language input sentence as the sentence of high similarity based on the vector space model, one of the similar document retrieving methods.

To obtain the same effect as the foregoing, a method to improve the translation quality is under study, by which each word in a query written in a first language is mechanically converted into a word or a phrase of a second language by using a dictionary, then a corresponding sentence(s) is retrieved from a set of second language sentences by utilizing the set of converted words and/or phrases of the second language, and the obtained second language sentence(s) is referred to the user.

However, the methods according to the related art, by which a similar first language sentence(s) is obtained merely on the basis of the words contained in the first language input sentence, involves the disadvantage that a second language sentence adequate as a translation of the first language input sentence, even if present in the set of pair data pieces, cannot be obtained as a result of the retrieval if the expression of the corresponding first language sentence in the sentence pair differs from that of the first language input sentence. Thus the methods can be effective only if the set of pair data contains a sentence composed of a set of words which are substantially the same as those contained in the first language input sentence.

Such a disadvantage becomes more noticeable as the number of the words contained in the input sentence becomes smaller, and consequently, in a case where a document including a large number of sentences is inputted, non-zero elements of the corresponding document vector significantly increase (substantial dimensions of the vector are raised), and accordingly the reliability of the retrieval result is enhanced, but in most cases actual pair data mostly consists of short sentences, and therefore it is practically difficult to obtain adequate related sentences (second language sentences) to refer to.

Furthermore, whereas a second language sentence(s) to refer to is obtained according to the related art by replacing individual words in the input sentence in the first language with words and/or phrases in the second language by using a dictionary, words and phrases in the second language available for expressing a given word in the first language are extremely diverse and, moreover, the adequate choice of a second language word out of those many alternatives depends on the meaning of the first language input sentence, making it virtually impossible to determine the choice in advance. Therefore, it is difficult to express in advance the relationship of correspondence between first language words and second language words in a comprehensive dictionary form, and it is difficult to obtain an adequate related sentence to refer to.

In view of this problem, the present applicant has already proposed a cross-lingual retrieval system capable of retrieving, on the basis of a query in a first language, a second language sentence(s) which is a more adequate related sentence(s) by using pair data (Japanese Unexamined Patent Application No. Hei 10-202788 [1998]).

This cross-lingual retrieval system stores in a paired sentence storing unit plural pairs each of a sentence in a first language and a corresponding translated sentence in a second language; when a query written in the first language is received from a query receiving unit, a first retrieval unit performs retrieval processing on a set of sentences in the first language sentences stored in the paired sentence storing unit according to the query. Then a second retrieval unit performs retrieval processing on a set of translated sentences written in the second language sentences stored in the paired sentence storing unit to find sentences similar to translated sentences written in the second language correspondingly to the sentences in the first language retrieved by the first retrieval unit.

In other words, retrieval based on the first language sentence is performed on the pair data and, using the second language sentences corresponding to the result of this retrieval, the retrieval of similar second language sentences is performed on the pair data. The successive double retrieval in the first and second languages using the pair data as a bridge makes it possible to retrieve second language sentences which are adequate translation of the query written in the first language without being greatly affected by any difference in expression or the number of words or phrases contained, moreover even if the input sentence in the first language is relatively short.

SUMMARY OF THE INVENTION

Although the cross-lingual retrieval system referred to above can achieve its intended effect, implementation of a similar effect is called for between sentences in more diverse languages in today's society where accelerated internationalization is resulting in everyday use of a wide variety of languages.

The present invention implements a related sentence retrieval system capable of providing users with adequate related sentences to refer to between sentences of many different languages as well by applying the aforementioned cross-lingual retrieval system.

A related sentence retrieval system pertaining to the present invention is provided with a former stage cross-lingual retrieval system for retrieving, on the basis of a query written in a first language, related sentences written in a second language and a latter stage cross-lingual retrieval system for retrieving, on the basis of related sentences in a second language outputted from the former stage cross-lingual retrieval system, related sentences written in a third language, and retrieves, via the second language, sentences written in the third language related to the query written in the first language.

Thus, the former stage cross-lingual retrieval system for retrieving on the basis of a first language sentence a related second language sentence and the latter stage cross-lingual retrieval system for retrieving from the second language a related third language sentence are connected in series.

More specifically, in the former stage cross-lingual retrieval system, a former stage pair data storing unit stores plural pair data piece sets each having a first language sentence and a second language sentence; when a query written in the first language sentence is received from first language sentence input unit, the former stage primary retrieving unit retrieves on a set of sentences in the first language stored in the former stage pair data storing unit on the basis of this received query; further, a former stage secondary retrieving unit performs, based on an independent word extracted from second language sentences paired with the respective first language sentences retrieved by the former primary retrieving unit, similar sentence retrieval from among a set of the second language sentences stored in the former pair data storing unit; and a second language sentence output unit outputs these retrieved sentences in the second language.

And in the latter stage cross-lingual retrieval system, a latter stage pair data storing unit stores plural pairs each of a sentence written in the second language sentence and a corresponding sentence written in the third language; when a second language sentence input unit receives sentences in the second language from the second language sentence output unit, a latter stage primary retrieving unit processes retrieval on a set of sentences in the second language stored in the latter stage pair data storing unit on the basis of these second language sentences; further, a latter stage secondary retrieving unit performs, based on an independent word extracted from third language sentences paired with the respective second language sentences retrieved by the latter stage primary retrieving unit, similar sentence retrieval from among a set of the third language sentences stored in the latter stage pair data storing unit; and a third language sentence output unit outputs these retrieved sentences in the third language.

A related sentence retrieval system pertaining to the present invention is provided with a first cross-lingual retrieval system for bidirectionally retrieving related sentences between sentences written in a first language and sentences written in a second language, and a second cross-lingual retrieval system for bidirectionally retrieving related sentences between sentences written in the second language and sentences written in a third language, for bidirectionally retrieving, via the second language related sentences between sentences written in the first language and sentences written in the third language, sentences by inputting second language sentences outputted from one of the cross-lingual retrieval systems to the other, and implements bidirectional related sentence retrieval between sentences in the first language and sentences in the third language via the second language.

Thus, the first cross-lingual retrieval system for performing bidirectional retrieval between sentences in the first language and sentences in the second language and the second cross-lingual retrieval system for performing bidirectional retrieval between sentences in the second language and sentences in the third language are connected in series, and information exchange between the two units is accomplished by sentences in the second language.

More specifically, in the first cross-lingual retrieval system, a first pair data storing unit stores plural pair data piece sets each having a first language sentence and a second language sentence; a first language sentence input unit receives a first language sentence; and a second language sentence input unit receives a second language sentence from the second cross-lingual retrieval system. And a first primary retrieving unit processes retrieval, on the basis of one of the languages of these received sentences, on a set of sentences in that one of the languages stored in the first pair data storing unit; further, a first secondary retrieving unit performs, based on an independent word extracted from the sentences of the other language paired with the respective sentences retrieved by the first primary retrieving unit, similar sentence retrieval on a set of the sentences of the other language stored in the first pair data storing unit; a first language sentence output unit outputs the retrieved first language sentence retrieved by the first secondary retrieving unit; and a second language sentence output unit outputs the retrieved second language sentences to the second cross-lingual retrieval system.

And in the second cross-lingual retrieval system, a second pair data storing unit stores plural pair data piece sets each of the second language sentence and the third language sentence; a second language sentence input unit receives a second language sentence from the first cross-lingual retrieval system; and a third language sentence input unit receives a third language sentence. And a second primary retrieving unit processes retrieval, on the basis of these received sentences in one of the languages, on a set of sentences in that one of the languages stored in the second pair data storing unit; further, a second secondary retrieving unit performs, based on an independent word extracted from the sentences of the other language paired with the respective sentences retrieved by the second primary retrieving unit, similar sentence retrieval on a set of the sentences of the other language stored in the second pair data storing unit; and a second language sentence output unit outputs the retrieved second language sentence to the first cross-lingual retrieval system.

Further, a related sentence retrieval system pertaining to the present invention is provided with n (n is 3 or a greater natural number) cross-lingual retrieval systems for bidirectionally retrieving related sentences between sentences written in a first language and sentences written in n other languages; a first language sentence input unit is shared by the cross-lingual retrieval systems; and a first language sentence output unit is also shared by them to implement bidirectional retrieval of related sentences via the first language between sentences in the other n languages.

Thus, sentences in the first language are handed over to and from the cross-lingual retrieval systems to implement bidirectional retrieval between sentences in n languages.

More specifically, in each cross-lingual retrieval system, a pair data storing unit stores plural pair data piece sets each of a first language sentence and a sentence in one of the other languages; a first language sentence input unit receives a first language sentence; and an other language sentence input unit receives sentences in other languages. And a primary retrieving unit processes retrieval, on the basis of these received sentences in one of the languages, on a set of sentences in that one of the languages stored in the pair data storing unit; further, a secondary retrieving unit performs, based on an independent word extracted from sentences of one of languages other than the language of the sentences retrieved by the primary retrieving unit, the sentences of the other language being paired with the respective sentences of the language retrieved by the primary retrieving unit and stored in the pair data storing unit, similar sentence retrieval on a set of the sentences of the other language stored in the pair data storing unit; and a first language sentence output unit outputs the retrieved sentence in the first language to another cross-lingual retrieval system.

Further, whereas the above-described related sentence retrieval system has a circular structure in which information is handed over back and forth via a first language sentence, it is also possible, according to the present invention to provide plural such circles having a first language sentence as an intermediary, to share a first language sentence input unit among these circles as well, the shared first language sentence input unit serving to bridge this plurality of circles to each other with the first language to bidirectionally retrieve related sentences between sentences in the other languages.

BRIEF DESCRIPTION OF THE DRAWINGS

Preferred embodiments of a related sentence retrieval system according to the present invention will be described in detail based on the drawings.

DETAILED DESCRIPTION OF THE PREFERRED EMBODIMENTS

Related sentence retrieval systems pertaining to the present invention will be specifically described with reference to illustrated embodiments thereof.

Figure 1:
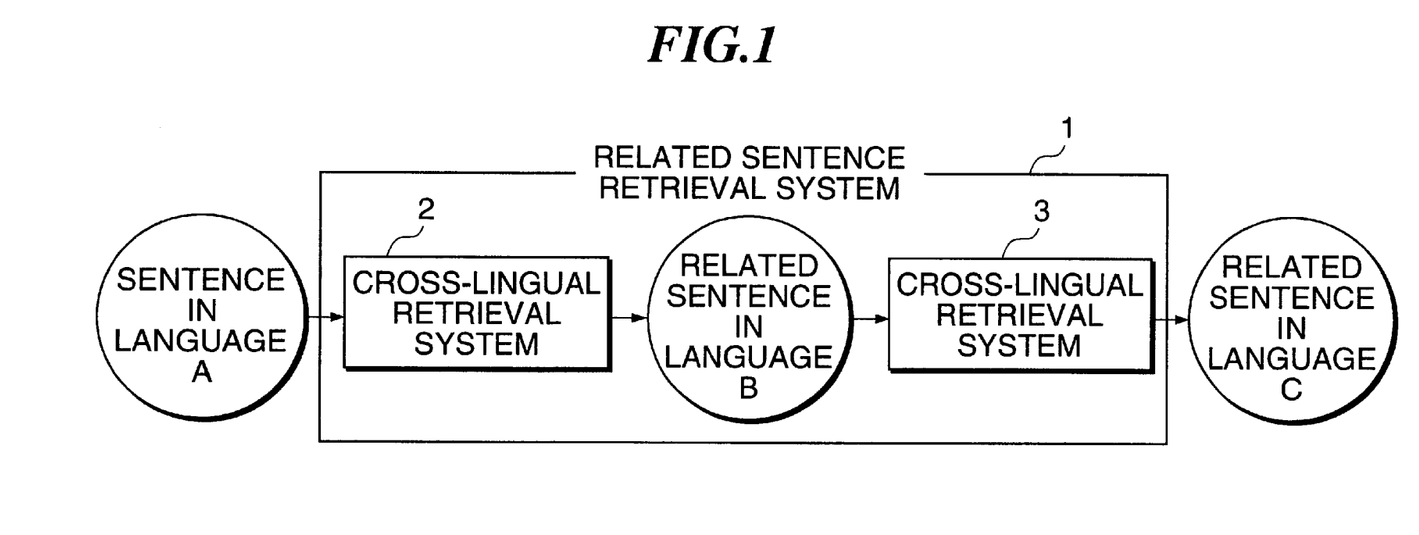
FIG. 1 is a diagram illustrating the configuration of a related sentence retrieval system pertaining to a first embodiment of the present invention.

FIG. 1 illustrates the configuration of a related sentence retrieval system pertaining to a first embodiment.

The related sentence retrieval system 1 according to this embodiment has a configuration in which a former cross-lingual retrieval system 2 and a latter stage cross-lingual retrieval system 3 are connected in series, wherein the result of retrieval from the former stage cross-lingual retrieval system 2 performing primary retrieval is inputted to the latter stage cross-lingual retrieval system 3 as a query.

The former stage cross-lingual retrieval system 2 is a program module for retrieving related sentences written in language B (second language sentences) on the basis of a sentence written in language A (first language sentence).

The latter stage cross-lingual retrieval system 3 is a program module for retrieving related sentences written in language C (third language sentences) on the basis of a sentence written in language B outputted from the former stage cross-lingual retrieval system 2.

Therefore, when a query written in language A is inputted to the related sentence retrieval system 1, the former stage cross-lingual retrieval system 2 retrieves and outputs related sentences written in language B on the basis of this sentence in language A, and the latter stage cross-lingual retrieval system 3 retrieves and outputs related sentences written in language C on the basis of this outputted language B; sentences related to the query written in the first language, written language the third language, are retrieved and outputted via the second language.

Figure 2:
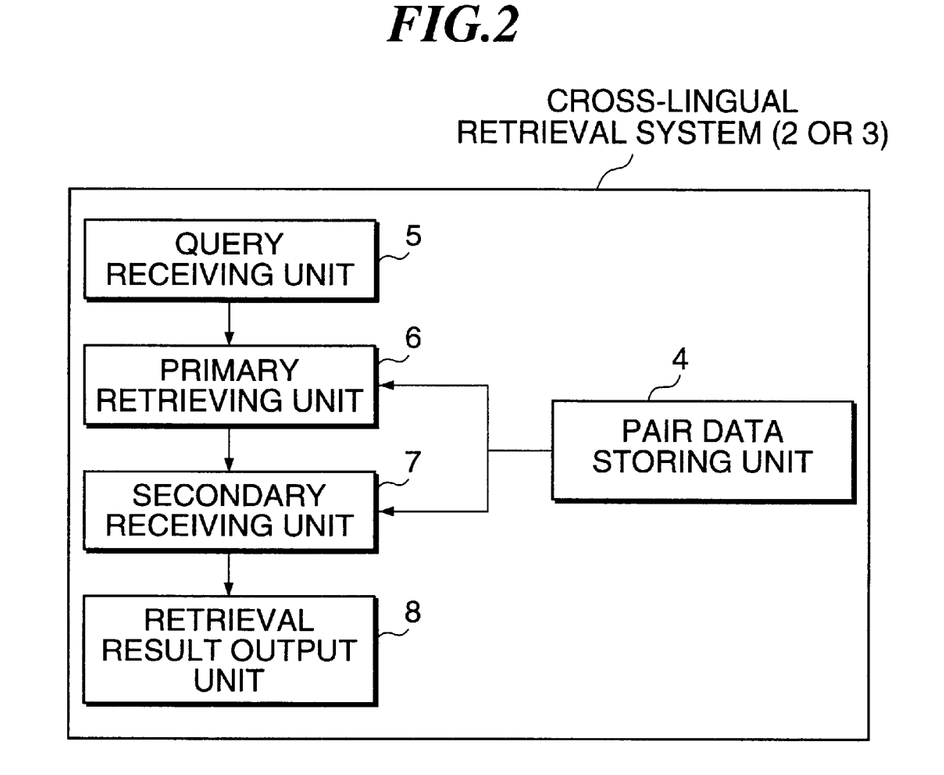
FIG. 2 is a diagram illustrating one example of configuration of a cross-lingual retrieval system for use in the present invention.

Each of the former stage cross-lingual retrieval system 2 and the latter stage cross-lingual retrieval system 3 has the same configuration illustrated in FIG. 2.

Thus, each cross-lingual retrieval system has a pair data storing unit 4 for storing plural pairs each of a sentence written in a certain language sentence and a corresponding sentence in another language; a query receiving unit 5 for receiving a query in the aforementioned certain language; a primary retrieving unit 6 for processing retrieval, on the basis of this query, on a set of sentences written in the aforementioned certain language, stored in the pair data storing unit 4; a secondary retrieving unit 7 for retrieving sentences similar to translated sentences in the aforementioned other language stored in the pair data storing unit 4 correspondingly to these retrieved sentences written in the aforementioned certain language from a set of translated sentences in the aforementioned other language stored in the pair data storing unit 4; and a retrieval result output unit 8 for outputting these sentences written in the aforementioned other language.

It has to be noted that, in this embodiment, the aforementioned certain language in the former stage crosslingual retrieval system 2 is language A, and the aforementioned other language is language B. Further, the aforementioned certain language in the latter stage cross-lingual retrieval system 3 is language B, and the aforementioned other language is language C.

The query receiving unit 5 in the former stage cross-lingual retrieval system 2 receives a query from a retrieving person, while the query receiving unit 5 in the latter stage cross-lingual retrieval system 3 receives as the query the retrieval result outputted from the retrieval result output unit 8 in the former stage cross-lingual retrieval system 2. Incidentally, the retrieval result output unit 8 of the former stage cross-lingual retrieval system 2 and the query receiving unit 5 of the latter stage cross-lingual retrieval system 3 perform the interfacing function of the two units, and they may as well be configured as an integrated functional unit.

Both in the former stage cross-lingual retrieval system 2 and in the latter stage cross-lingual retrieval system 3, the primary retrieving unit 6 and the secondary retrieving unit 7 retrieve similar sentences by the following method, for instance.

Similar sentence retrieval by the primary retrieving unit 6 and the secondary retrieving unit 7 is performed, for example, after extracting independent words from the retrieval query written in a certain language, by either (1) using as the retrieval result, out of similar sentences (sentences in that certain language) obtained in accordance with a vector space model based on a set of the extracted independent words, sentences having a distance value higher than a prescribed threshold or (2) using as the retrieval result, out of similar sentences (sentences in that certain language) obtained by calculated based on the quantity of extended mutual information to be described afterwards, sentences having a larger value of the sum of extended mutual information quantities than a prescribed threshold.

It is to be noted that each sentence in the set of sentences obtained from the primary retrieving unit 6 is replaced by a corresponding sentence in another language stored in the pair data storing unit 4, and inputted to the secondary retrieving unit 7.

Incidentally, where plural sentences are to be inputted, the total sum vector of sentence vectors corresponding to each of the inputted sentences can be deemed to be the input sentence vector and put to similar calculation to that in the case of a single sentence input. For similar sentence retrieval utilizing the vector space model, there is known, for instance, the method described in Japanese Published Unexamined Patent No. Hei 9-50435 (1997).

Hereupon, retrieval processing by a cross-lingual retrieval system utilizing extended mutual information quantity will be described in further detail below with respect to a case in which sentences written in a certain language are sentences in Japanese and sentences written in another language are sentences in English.

Figure 3:
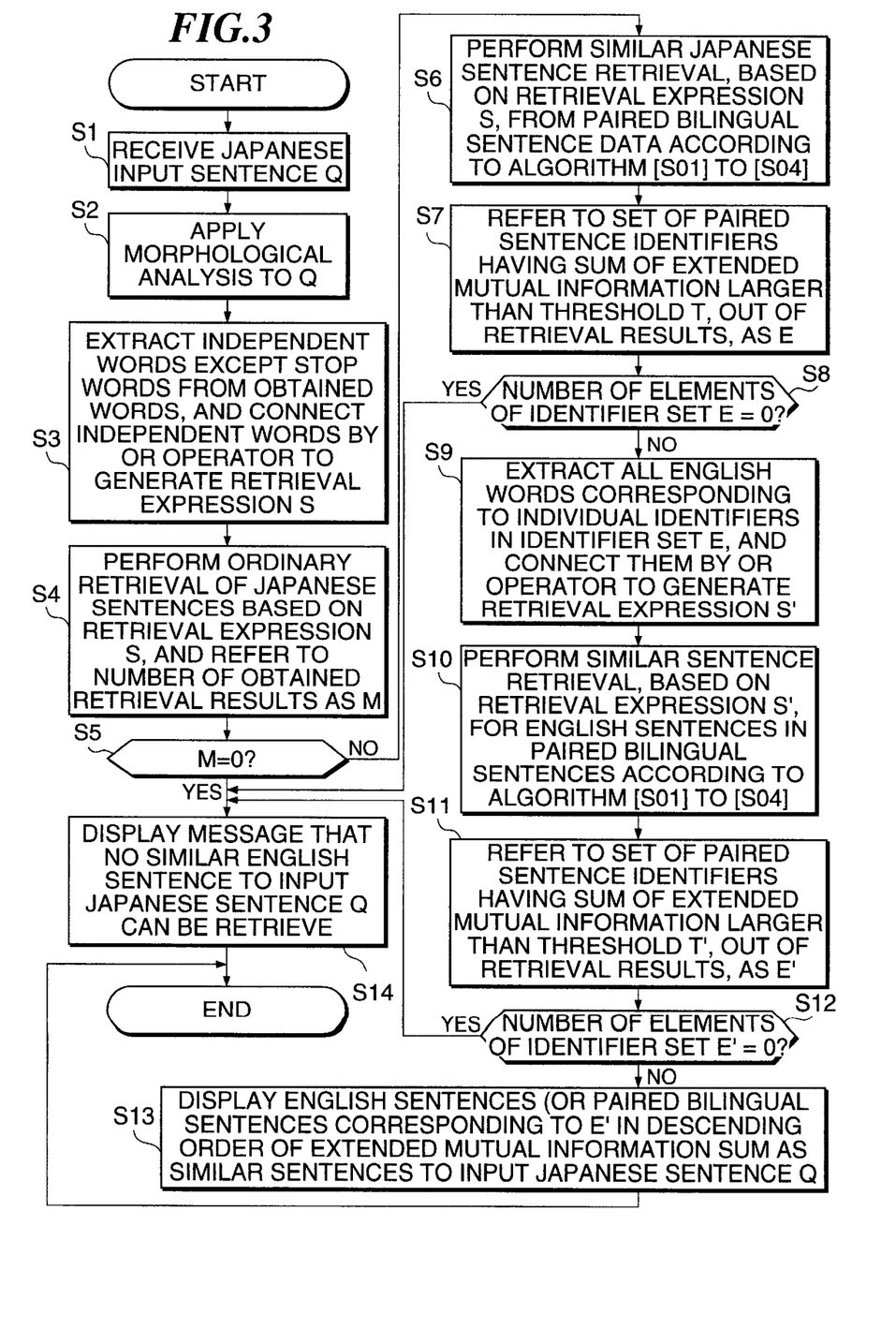
FIG. 3 is a flowchart showing the sequence of retrieval processing pertaining to the first embodiment of the present invention.

FIG. 3 shows in a flowchart an algorithm executed by a cross-lingual retrieval system of the above-described configuration, and execution of the algorithm gives a related sentence in English similar to the inputted query in Japanese.

Incidentally, in the following sequence of processing, steps S2 to S8 are performed by the primary retrieving unit 6, while steps S9 to S11 are carried out by the secondary retrieving unit 7.

First, as the query receiving unit 5 receives the inputted sentence in Japanese (query) Q (step S1), it subjects the query Q in Japanese to morphological analysis processing to divided into words (step S2).

And it extracts independent words other than stop words out of the words obtained from the query Q in Japanese, and generates a retrieval expression S by connecting the independent words by a logical sum operator OR (step S3).

Then, with the retrieval expression S as input, the Japanese sentence of the pair data stored in the pair data storing unit 4 is subjected to usual retrieval (e.g. keyword matching), and the number of retrieval results obtained by retrieving Japanese sentences containing any word in the retrieval expression S is represented by M (step S4).

And it is judged whether or not the pertinent M is 0 (step S5) and, if the M is 0, a display to the effect that no English sentence similar to the inputted Japanese query Q in the data for retrieval is outputted from the retrieval result output unit 8 to end processing (step S14).

To add, if not even a word in the input Japanese sentence is contained in the pair data from which retrieval is intended to be done, there is almost no possibility for a similar sentence to exist in that pair data, and accordingly this mode of implementation avoids wasteful subsequent attempts to retrieve similar sentences by performing usual retrieval (step S4) as preprocessing.

On the other hand, where M is not 0, similar sentence retrieval is attempted on Japanese sentences in pair data pieces with the retrieval expression S as the input (step S6). Thus, the algorithm [S01] to [S04] to be explained below is executed, and similar sentence retrieval is carried out with the set of Japanese sentences in the pair data pieces as the document set D and the set of independent Japanese words stored in the memory as the independent word set W. Incidentally, in this memory, the results of morphological analysis of all the sentences stored in the pair data storing unit 4 are received and, after extraction of independent words (except stop words) from the analytical results, are stored as classified by the identifier of the pair data.

And it is judged, with the set of pair data identifiers each having a total sum of extended mutual information surpassing a threshold T (a non-negative constant set in advance) out of these retrieval results being represented by E (step 7), whether or not the number of elements of this identifier set E is 0 (step S8).

As a result, while the processing goes on to step S14 to end it if the number of elements in the identifier set E is 0 because no adequate similar sentence is obtained, if the number of elements in the identifier set E is not 0, all the English words corresponding to individual identifiers in the identifier set E are extracted from the aforementioned memory and connected with logical sum operator OR into the retrieval expression S (step S9).

And, with the retrieval express S' as the input, similar sentence retrieval is attempted on English sentences in the pair data (step 10). Thus, algorithm [S01] to [S04] to be explained below is executed, and similar sentence retrieval is attempted with the set of English sentences in the pair data as the document set D and the set of independent English words stored in the aforementioned memory as the independent word set W.

And, it is judged, with the set of pair data identifiers each having a total sum of extended mutual information surpassing a threshold T' (a non-negative constant set in advance) out of these retrieval results being represented by E' (step 11), whether or not the number of elements of this identifier set E' is 0 (step S12).

As a result, while the processing goes on to step S14 to end if it the number of elements in the identifier set E' is 0 because no adequate similar sentence is obtained, if the number of elements in the identifier set E' is not 0, the retrieval result output unit 8 displays English sentences (or pair data) corresponding to the identifier set E' in the descending order of the total sum of extended mutual information quantity, and ends processing (step S13).

Figure 4:
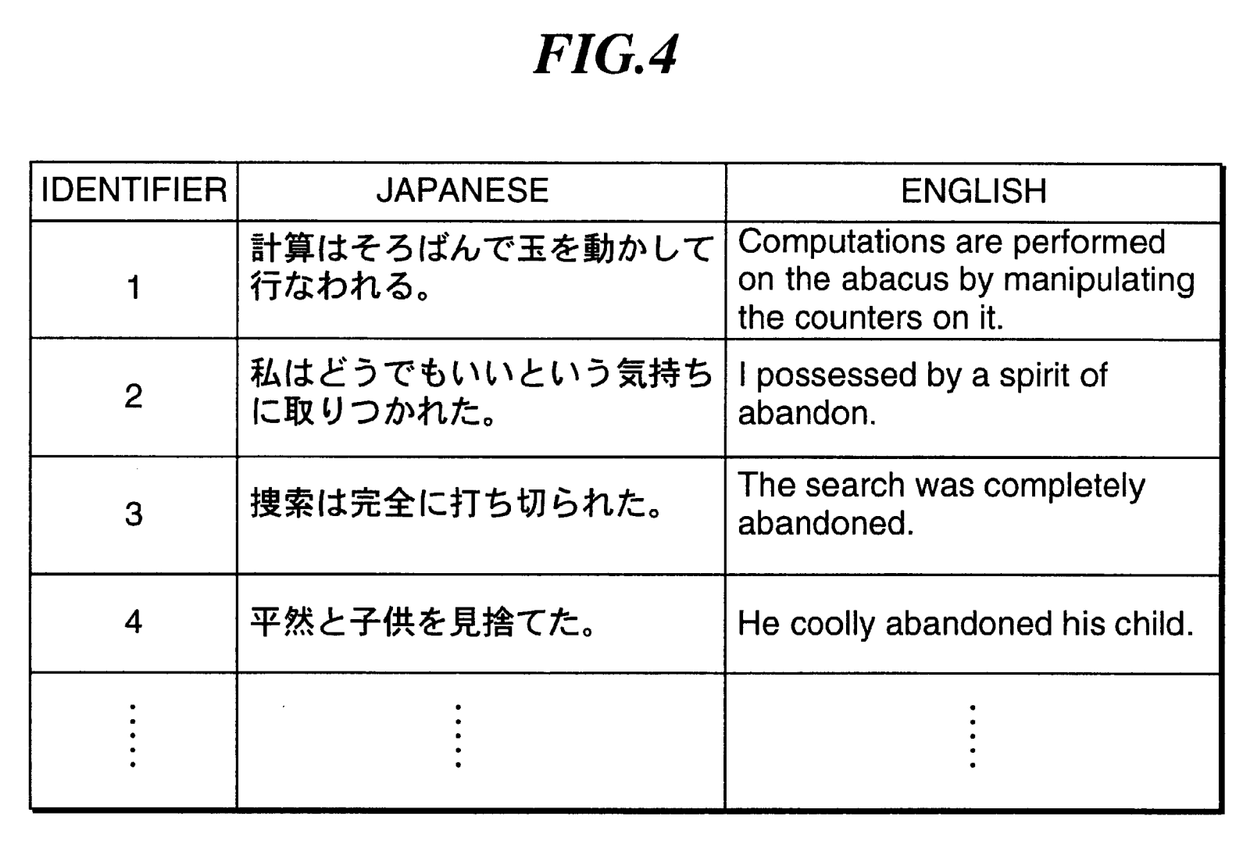
FIG. 4 is a diagram illustrating an example of pair data.

To add, FIG. 4 illustrates an example of plural pair data pieces which are stored in the pair data storing unit 4, and each set of pair data pieces consists of a Japanese sentence uniquely identified by a pair data identifier and an English sentence corresponding thereto.

Figure 5:
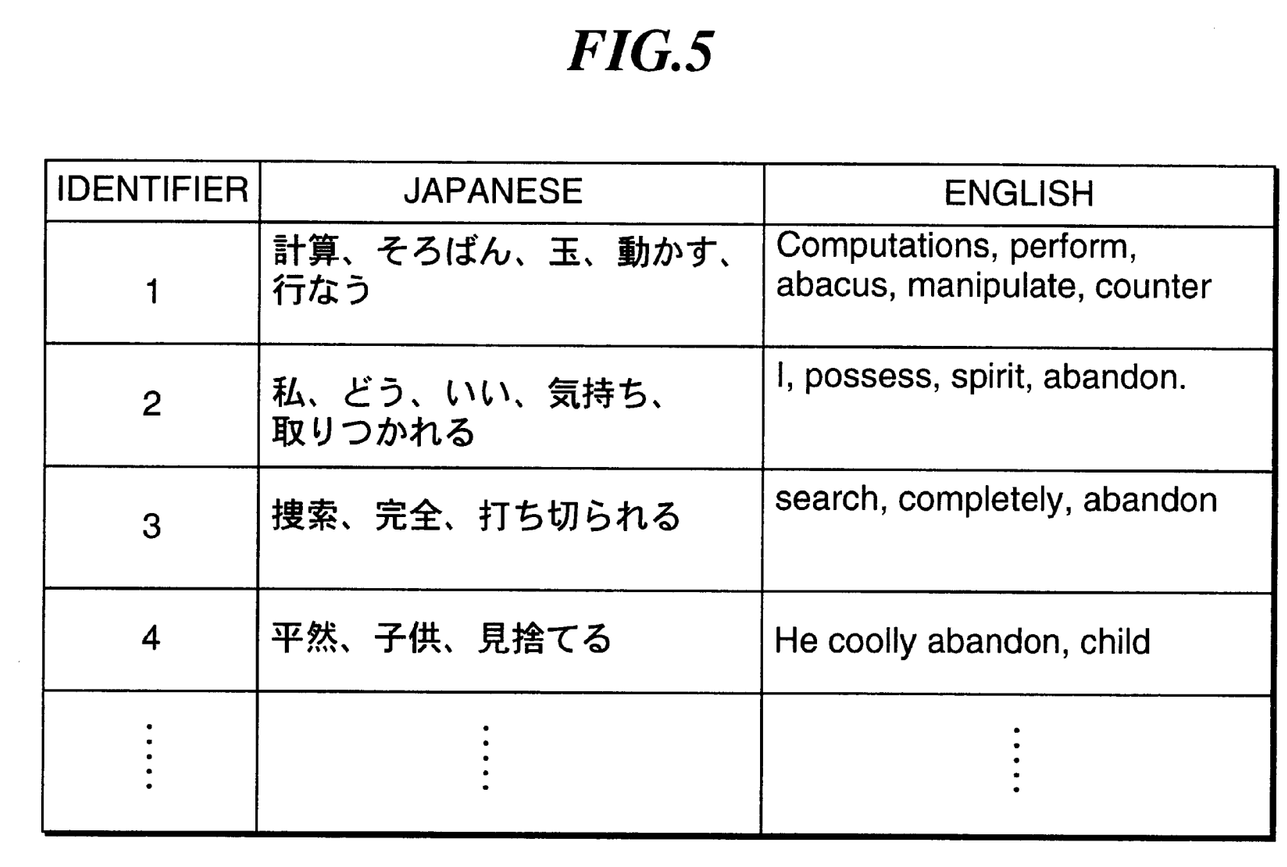
FIG. 5 is a diagram illustrating an example of the result of morphological analysis of pair data.

Further, FIG. 5 illustrates an example of the result of morphological analysis of pair data to be stored in the aforementioned memory, wherein independent Japanese words extracted from Japanese sentences in the pair data and independent English words extracted from corresponding English sentences are identified by the same pair data identifier as that of the original pair data. Thus, the pair data pieces stored in this memory and the pair data pieces stored in the pair data storing unit 12 are uniquely matched to each other by pair data identifiers.

To add, in this embodiment, in order to obtain contents to be stored into the aforementioned memory, all the pair data pieces stored in the pair data storing unit 4 are subjected to morphological analysis processing before attempting similar sentence retrieval.

The following algorithm [S01] to [S04] using the aforementioned extended mutual information quantity (MI') is such as described below. Incidentally, the sentence set on which to attempt retrieval is represented by D, and the retrieval expression by S.

[S01] Extracted by carrying out retrieval on the document set D with the retrieval expression S and applying morphological analysis (process of dividing a sentence into words) to all the independent words present in the obtained sentence set. To add, the obtained independent word set is represented by W=(w1, w2, ..., wn).

[S02] The quantity of extended mutual information (MI'(S, w1), MI'(S, w2), ..., MI'(S, wn)) between the retrieval expression S and each independent word in the independent word set W is obtained.

[S03] Calculation to add the value of MI'(S, wi) to sentences containing an element wi of the independent word set W is performed with respect to i satisfying the condition of $1 \leq i \leq n$, with all the sentences in the sentence set D being made the object of processing.

[S04] The sentences are outputted in the descending order of the sum of values of MI'(S, wi) to be made the result of similar sentence retrieval based on the retrieval expression S.

Here, the quantity of mutual information (MI') between the retrieval expression S and a word "word" is defined by Expression (1). If it is to be noted that, if the number of all the documents to be the object of retrieval is M, the number of documents containing a word "word" and obtained according to the retrieval expression S is a', the number of documents obtained according to the retrieval expression S and not containing "word" is b', and the number of documents containing "word" except the documents obtained according to the retrieval expression S is c', the probabilities of appearance are represented by Expressions (2).

[Expression 1]

$$MI'(S, word) = \log_2\{prob(S, word)/prob(S)prob(word)\} \quad \text{(Expression 1)}$$

[Expressions 2]

$$prob(S, word) = a'/M$$

$$prob(S) = (a'+b')/M$$

$$prob(word) = (a'+c')/M \quad \text{(Expressions 2)}$$

Figure 6:
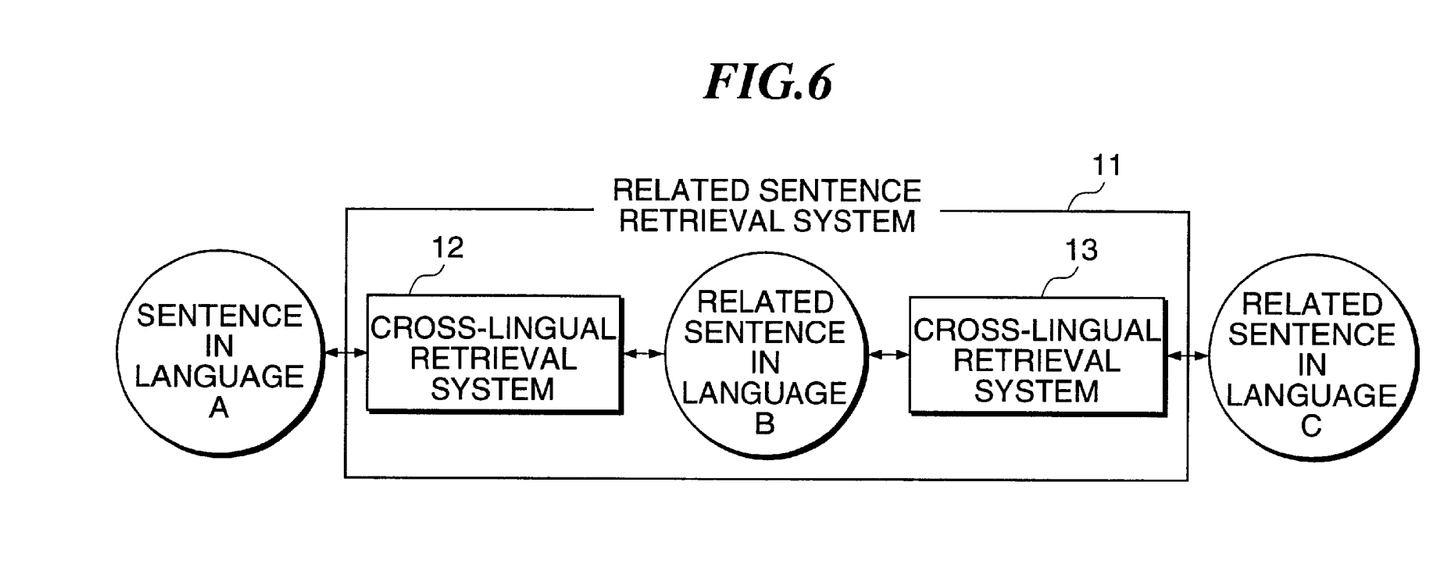
FIG. 6 is a diagram illustrating the configuration of a related sentence retrieval system pertaining to a second embodiment of the present invention.

FIG. 6 illustrates the configuration of a related sentence retrieval system pertaining to a second embodiment.

A related sentence retrieval system 11 according to this embodiment has a configuration in which a first cross-lingual retrieval system 12 and a second stage cross-lingual retrieval system 13 are connected in series, wherein it is made possible to carry out both a flow of retrieval processing from the first cross-lingual retrieval system 12 to the second cross-lingual retrieval system 13 and a reverse flow of retrieval processing from the second cross-lingual retrieval system 13 to the first cross-lingual retrieval system 12.

In the former flow of processing, the first cross-lingual retrieval system 12 performs primary retrieval on the basis of a query inputted by a retrieving person, and the second cross-lingual retrieval system 13 to which the result of this primary retrieval is inputted performs secondary retrieval. In the latter flow of processing, the second cross-lingual retrieval system 13 performs primary retrieval on the basis of a query inputted by a retrieving person, and the first cross-lingual retrieval system 12 to which the result of this primary retrieval is inputted performs secondary retrieval.

Thus the cross-lingual retrieval system 12 carries out retrieval processing on related sentences in language B on the basis of sentences in language A and retrieval processing on related sentences in language A on the basis of sentences in language B, while the cross-lingual retrieval system 13 carries out retrieval processing on related sentences in language C on the basis of sentences in language B and retrieval processing on related sentences in language B on the basis of sentences in language C.

Therefore, when a query in language A is inputted to the related sentence retrieval system 11, related sentences written in language C are retrieved and outputted via sentences in language B by the synergic actions of the cross-lingual retrieval systems 12 and 13 and, conversely to this, when a query in language C is inputted to the related sentence retrieval system 11, related sentences written in language A are retrieved and outputted via sentences in language B by the synergic actions of the cross-lingual retrieval systems 12 and 13.

Figure 7:
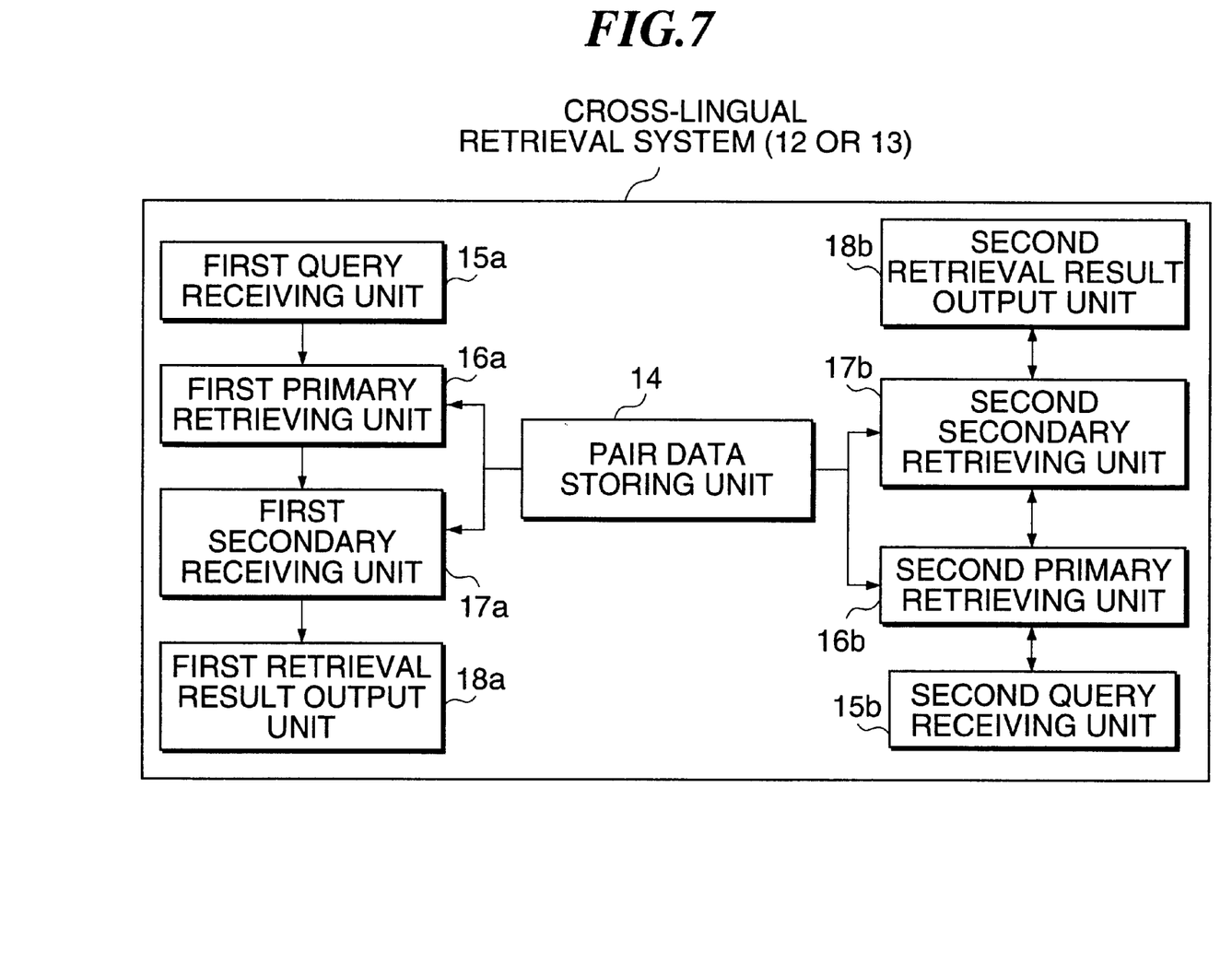
FIG. 7 is a diagram illustrating one example of configuration of a cross-lingual retrieval system for use in the present invention.

Each of these cross-lingual retrieval system 12 and 13 has the same configuration illustrated in FIG. 7.

Thus, each cross-lingual retrieval system has pair a data storing unit 14 for storing plural pairs each of a sentence written in a certain language sentence and a corresponding sentence in another language; a first query receiving unit 15a for receiving a query in the aforementioned certain language; a first primary retrieving unit 16a for processing retrieval, on the basis of this query, on a set of sentences written in the aforementioned certain language, stored in the pair data storing unit 14; a first secondary retrieving unit 17a for retrieving sentences similar to translated sentences in the aforementioned other language stored in the pair data storing unit 14 correspondingly to these retrieved sentences written in the aforementioned certain language from a set of translated sentences in the aforementioned other language stored in the pair data storing unit 14; a first retrieval result output unit 18a for outputting these sentences written in the aforementioned other language; a second query receiving unit 15b for receiving a query in the aforementioned other language; a second primary retrieving unit 16b for processing retrieval, on the basis of this query, on a set of sentences written in the aforementioned other language, stored in the pair data storing unit 14; a second secondary retrieving unit 17b for retrieving sentences similar to translated sentences in the aforementioned certain language stored in the pair data storing unit 14 correspondingly to these retrieved sentences written in the aforementioned other language from a set of translated sentences in the aforementioned certain language stored in the pair data storing unit 14; and a second retrieval result output unit 18b for outputting these sentences written in the aforementioned certain language.

It has to be noted that, in this embodiment, the aforementioned certain language in the former stage crosslingual retrieval system 12 is language A, and the aforementioned other language is language B. Further, the aforementioned certain language in the latter stage cross-lingual retrieval system 13 is language B, and the aforementioned other language is language C.

The first query receiving unit 15a in the cross-lingual retrieval system 12 receives a query from a retrieving person, while the first query receiving unit 15a in the cross-lingual retrieval system 13 receives as the query the retrieval result outputted from the first retrieval result output unit 18a in the cross-lingual retrieval system 12. Also, the second query receiving unit 15b in the cross-lingual retrieval system 13 receives a query from a retrieving person, while the second query receiving unit 15b in the cross-lingual retrieval system 13 receives as the query the retrieval result outputted from the second retrieval result output unit 18b in the cross-lingual retrieval system 13.

Incidentally, since the functional units in this embodiment are similar to their respective counterparts in the first embodiment, similar configurations and functions being shared between the pair data storing unit 14 and the pair data storing unit 4, between the query receiving units 15a and 15b and the query receiving unit 5, between the primary retrieving units 16a and 16b and the primary retrieving unit 6, between the secondary retrieving units 17a and 17b and the secondary retrieving unit 7, and between the retrieval result output units 18a and 18b and the retrieval result output unit 8, their description is dispensed with here.

Therefore, according to the related sentence retrieval system 11 of this embodiment, it is possible to accomplish bidirectional retrieval upon related documents between language A and language C with language B as an intermediary.

Figure 8:
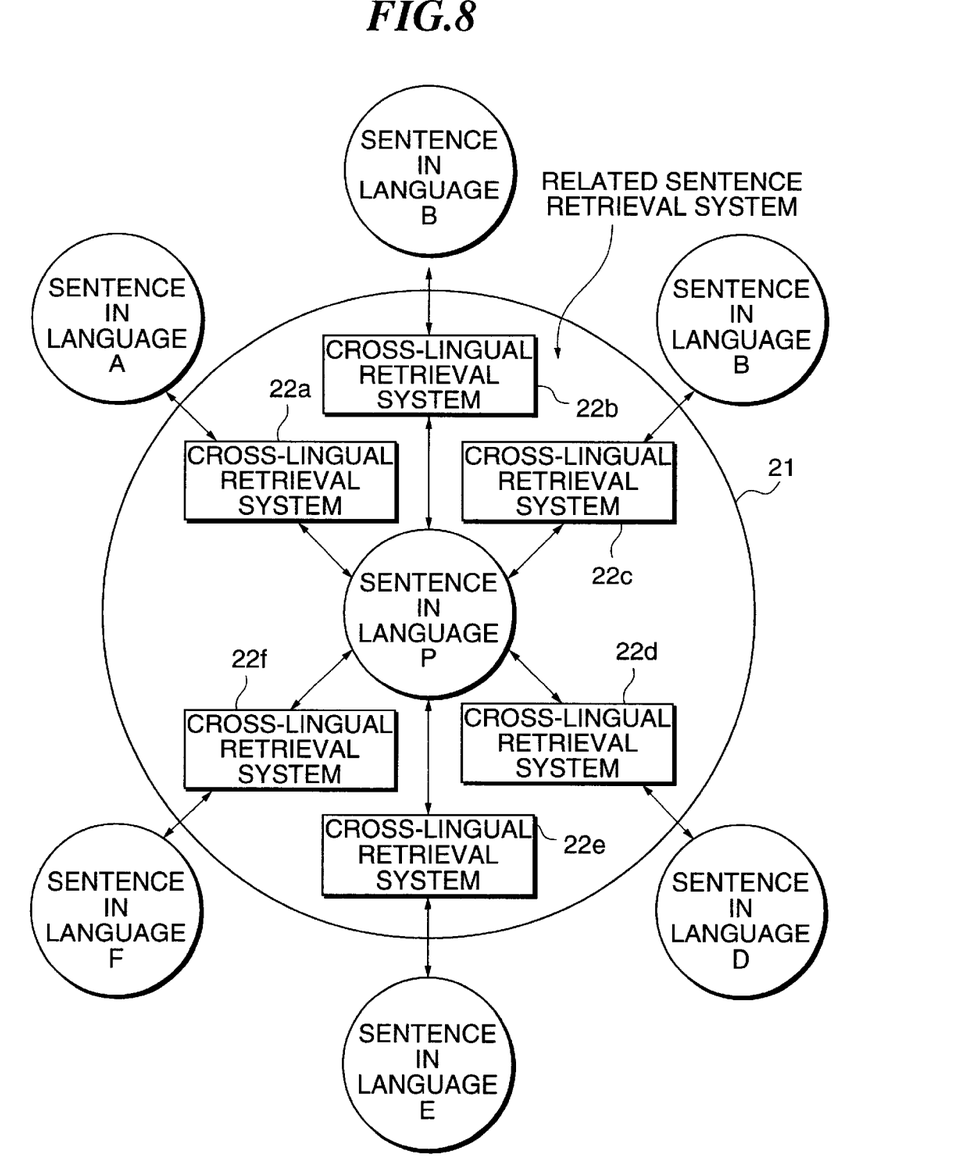
FIG. 8 is a diagram illustrating the configuration of a related sentence retrieval system pertaining to a third embodiment of the present invention.

FIG. 8 illustrates the configuration of a related sentence retrieval system pertaining to a third embodiment.

A related sentence retrieval system 21 according to this embodiment has a configuration in which a cross-lingual retrieval system 22a for bidirectionally retrieving mutually related documents between sentences in language A and sentences in language P, a cross-lingual retrieval system 22b for bidirectionally retrieving mutually related documents between sentences in language B and sentences in language P, a cross-lingual retrieval system 22c for bidirectionally retrieving mutually related documents between sentences in language C and sentences in language P, a cross-lingual retrieval system 22d for bidirectionally retrieving mutually related documents between sentences in language D and sentences in language P, a cross-lingual retrieval system 22e for bidirectionally retrieving mutually related documents between sentences in language E and sentences in language P, and a cross-lingual retrieval system 22f for bidirectionally retrieving mutually related documents between sentences in language F and sentences in language P are connected in a radial form with the sentences in language P as an intermediary.

Whereas each cross-lingual retrieval system performs bidirectional similar sentence retrieval as its counterpart in the second embodiment does, in this embodiment the input unit for receiving sentences in language P is shared by all the cross-lingual retrieval systems and the output unit to output sentences in language P is also shared to let sentences in language P to bridge the individual cross-lingual retrieval systems.

Incidentally, since details of each cross-lingual retrieval system are similar to those of the second embodiment, their description is dispensed with.

Therefore if, for instance, a retrieving person inputs a query in language A, this sentence in language A is converted by the cross-lingual retrieval system 22a into a sentence in language P, and this sentence in language P is converted by the cross-lingual retrieval systems 22b to 22f into related sentences written different languages from B to F. To add, if language designating information is added to this query in language A query and provide each cross-lingual retrieval system with a router based on that designating information, it is possible to have sentences in language P converted by a cross-lingual retrieval system 22a processed by a cross-lingual retrieval system for the designated language alone.

To add, while an example in which six cross-lingual retrieval systems are provided and related sentences are bidirectionally retrieved between the six languages A to F with sentences in language P as an intermediary is illustrated for this embodiment, any number of cross-lingual retrieval systems, not less than three, may be arranged radially.

Figure 9:
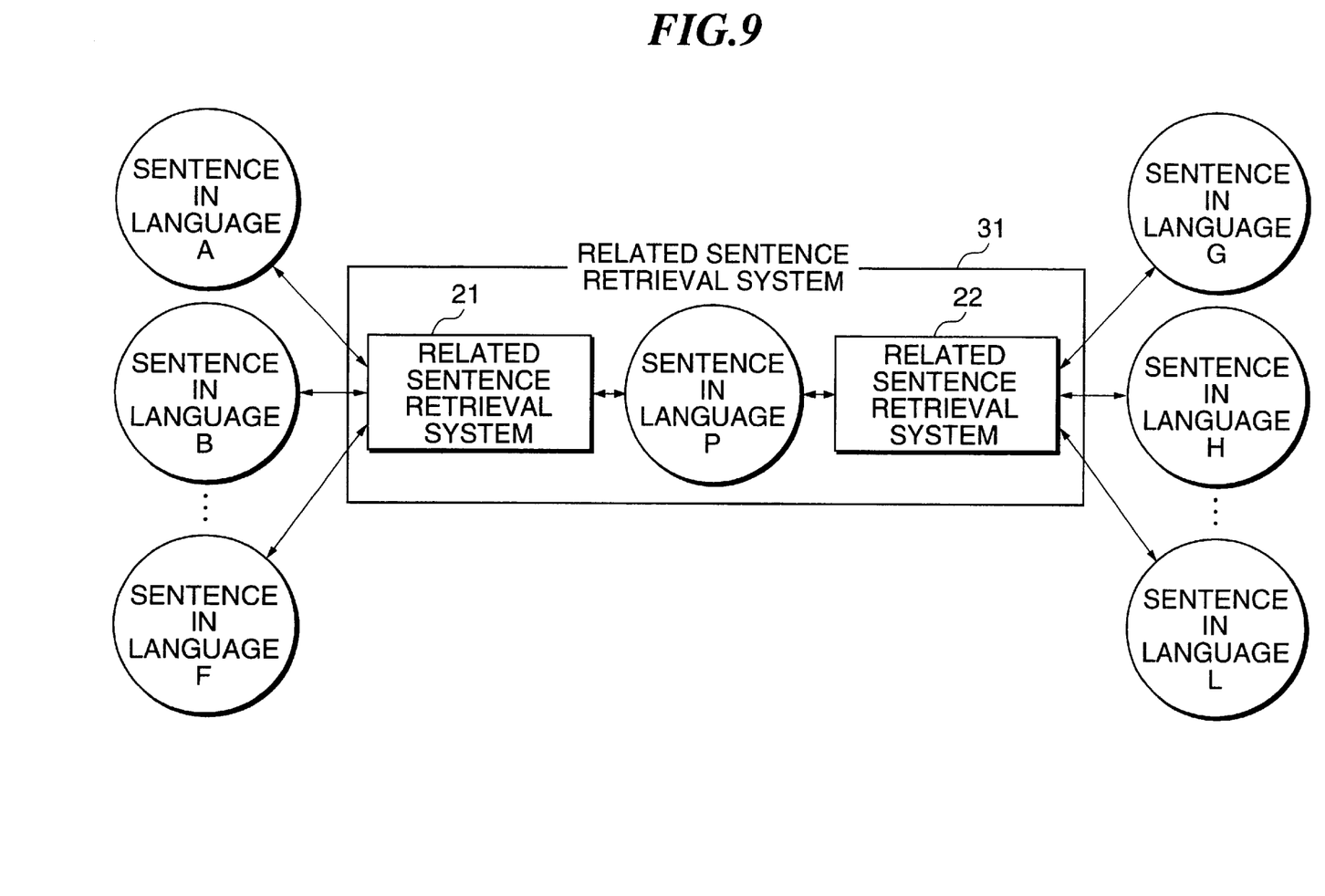
FIG. 9 is a diagram illustrating the configuration of a related sentence retrieval system pertaining to a fourth embodiment of the present invention.

FIG. 9 illustrates the configuration of a related sentence retrieval system pertaining to a fourth embodiment.

A related sentence retrieval system 31 according to this embodiment has a configuration in which a cross-lingual retrieval system 21, shown in the third embodiment, for bidirectionally retrieving mutually related documents between sentences in six languages A to F with sentences in language P as an intermediary and a cross-lingual retrieval system 22 of a similar configuration to that for bidirectionally retrieving mutually related documents between sentences in six languages G to L with sentences in language P as an intermediary are connected to each other with sentences in language P as an intermediary.

Whereas each of the cross-lingual retrieval systems 21 and 22 performs bidirectional similar sentence retrieval between six languages A to F or G to L as the third embodiment does, in this embodiment the input unit for receiving sentences in language P is shared by both cross-lingual retrieval systems 21 and 22 and the output unit to output sentences in language P is also shared to let sentences in language P to bridge the individual cross-lingual retrieval systems.

Therefore this embodiment enables plural (two or more) related sentence retrieval systems to be bridged by sentences in a common language, and the range of languages permitting related sentence retrieval to be readily extended on a unit-by-unit basis.

As hitherto described, as the present invention makes it possible to (1) achieve pair data retrieval with little retrieval omission from an extensive range of bilateral paired sentence information even if the query in a first language is relatively short, (2) to perform adequate pair data retrieval without depending on differences the expression of the query in the first language, and (3) to dynamically acquire the relationship of correspondence between first language words and second language words from extensive pair data information without requiring a dictionary prepared in advance by executing in combination first retrieval on sentences in a first sentence and second retrieval on sentences in a second language using pair data of a sentence in the first language sentence and one in the second language, it is possible, by applying a cross-lingual retrieval system capable of providing the effect to enable bilateral sentence retrieval according to the meaning of the query in the first language to be achieved, to extend retrieval to cover sentences in an even greater variety of sentences in different languages and sentences in even more diverse languages and, by virtue of extension to make possible bidirectional retrieval as well, to satisfy social requirements, resulting in rapid implementation of document processing in a great variety of languages.

What is claimed is:

1. A related sentence retrieval system having n (n is 3 or a natural number greater than 3) cross-lingual retrieval systems for bidirectionally retrieving related sentences between sentences written in a first language and sentences written in each of n other languages, wherein     each of the n cross-lingual retrieval systems comprises:

a pair data storing unit that stores a plurality of pair data pieces each having a first language sentence and a sentence of one of n languages having a same meaning;

a first language sentence input unit that receives a first language sentence;

an other language sentence input unit that receives a sentence of the one of n languages;

a primary retrieving unit that performs, on the basis of a sentence received from the first language sentence input unit or the other language sentence input unit, retrieval on a set of sentences of the received language stored in the pair data storing unit;

a secondary retrieving unit that performs, based on an independent word extracted from sentences of one of languages other than the language of the sentences retrieved by the primary retrieving unit, the sentences of the other language being paired with the respective sentences of the language retrieved by the primary retrieving unit and stored in the pair data storing unit, similar sentence retrieval on a set of the sentences of the other language stored in the pair data storing unit;

a first language sentence output unit that outputs first language sentences retrieved by the secondary retrieving unit; and         an other language sentence output unit that outputs sentences of the other language retrieved by the secondary retrieving unit, wherein the first language sentence input unit and the first language sentence output unit are shared by the n cross-lingual retrieval systems that, using the first language, bidirectionally retrieve related sentences among sentences of n other languages.

2. A related sentence retrieval system comprising:

a plurality of the related sentence retrieval systems as set forth in claim 1, wherein a first language sentence input unit and a first language sentence output unit are share by the plurality of the related sentence retrieval systems that, using the first language sentence, retrieve related sentences among sentences of plural languages other than the first language.

3. A related sentence retrieval system having a first cross-lingual retrieval system for bidirectionally retrieving related sentences between first language sentences and second language sentences, and a second cross-lingual retrieval system for bidirectionally retrieving related sentences between the second language sentences and third language sentences, the system bidirectionally retrieving the related sentences between the first language sentences and the third language sentences by inputting the second language sentences retrieved by one of the two cross-lingual retrieval system to the other system, wherein     the first cross-lingual retrieval system comprises:

a first pair data storing unit that stores a plurality of pair data pieces each having a first language sentence and a second language sentence having a same meaning;

a first language sentence input unit that receives a first language sentence;

a second language sentence input unit that receives second language sentences from the second cross-lingual retrieval system;

a first primary retrieving unit that performs retrieval, on the basis of the first language sentence received from the first language sentence input unit or the second language sentences received from the second language sentence input unit, on a set of sentences of the received language stored in the first pair data storing unit;

a first secondary retrieving unit that performs, based on an independent word extracted from the sentences of the other language paired with the respective sentences retrieved by the first primary retrieving unit, similar sentence retrieval on a set of the sentences of the other language stored in the first pair data storing unit;

a first language sentence output unit that outputs the first language sentences retrieved by the first secondary retrieving unit; and         a second language sentence output unit that outputs the second language sentences retrieved by the first secondary retrieving unit to the second cross-lingual retrieval system; and     the second cross-lingual retrieval system comprises:

a second pair data storing unit that stores a plurality of pair data pieces each having a second language sentence and a third language sentence having a same meaning;

a second language sentence input unit that receives the second language sentences from the first cross-lingual retrieval system;

a third language sentence input unit that receives a third language sentence;

a second primary retrieving unit that performs retrieval, on the basis of the second language sentences received from the second language sentence input unit or the third language sentence received from the third language sentence input unit, on a set of sentences of the received language stored in the second pair data storing unit;

a second secondary retrieving unit that performs, based on an independent word extracted from the sentences of the other language paired with the respective sentences retrieved by the second primary retrieving unit, similar sentence retrieval on a set of the sentences of the other language stored in the second pair data storing unit;

a third language sentence output unit that outputs the third language sentences retrieved by the second secondary retrieving unit; and         a second language sentence output unit that outputs the second language sentences retrieved by the second secondary retrieving unit to the first cross-lingual retrieval system.

4. A related sentence retrieval system, having a former stage cross-lingual retrieval system for retrieving, on the basis of a query written in a first language, related sentences written in a second language, and a latter stage cross-lingual retrieval system for retrieving, on the basis of the related sentences in the second language outputted from the former stage cross-lingual retrieval system, sentences written in a third language related to the query written in the first language using the retrieved second language sentences, wherein     the former stage cross-lingual retrieval system comprises:

a former stage pair data storing unit that stores a plurality of pair data pieces each having a first language sentence and a second language sentence having a same meaning;

a first language sentence input unit that receives a query written in the first language;

a former stage primary retrieving unit that retrieves first language sentences similar to the query from among a set of the first language sentences stored in the former stage pair data storing unit;

a former stage secondary retrieving unit that performs, based on an independent word extracted from second language sentences paired with the respective first language sentences retrieved by the former primary retrieving unit, similar sentence retrieval from among a set of the second language sentences stored in the former pair data storing unit; and a second language sentence output unit that outputs the second language sentences retrieved by the former stage secondary retrieving unit; and the latter stage cross-lingual retrieval system comprises:

a latter stage pair data storing unit that stores a plurality of pair data pieces each having a second language sentence and a third language sentence having a same meaning;

a second language sentence input unit that receives sentences in the second language outputted from the second language sentence output unit of the former stage cross-lingual retrieval system;

a latter stage primary retrieving unit that performs retrieval on the set of the second language sentences stored in the latter stage pair data storing unit on the basis of the received second language sentences;

a latter stage secondary retrieving unit that performs, based on an independent word extracted from third language sentences paired with the respective second language sentences retrieved by the latter stage primary retrieving unit, similar sentence retrieval from among a set of the third language sentences stored in the latter stage pair data storing unit; and a third language sentence output unit that outputs the third language sentences retrieved by the latter stage secondary retrieving unit.

* * * * *